United States Patent [19]

Sugiura et al.

[11] Patent Number: 4,483,839

[45] Date of Patent: Nov. 20, 1984

[54] PROCESS FOR PRODUCING SILICON NITRIDE

[75] Inventors: Masahiro Sugiura, Aichi; Toshio Kandori, Seto; Haruo Doi, Nagoya, all of Japan

[73] Assignee: Kabushiki Kaisha Toyota Chuo Kenkyusho, Aichi, Japan

[21] Appl. No.: 514,754

[22] Filed: Jul. 18, 1983

[30] Foreign Application Priority Data

Aug. 19, 1982 [JP] Japan .................. 57-143600

[51] Int. Cl.$^3$ .......................................... C01B 21/068
[52] U.S. Cl. ...................................... 423/344; 501/97
[58] Field of Search .................... 423/344; 501/97

[56] References Cited

U.S. PATENT DOCUMENTS 3,754,076  8/1973  Cutler .................. 423/345
3,855,395  12/1974  Cutler .................. 423/344

FOREIGN PATENT DOCUMENTS 52-00799  1/1977  Japan .................. 423/344

Primary Examiner—John Doll
Assistant Examiner—Steven Capella
Attorney, Agent, or Firm—Blum, Kaplan, Friedman, Silberman & Beran

[57] ABSTRACT

Impurities are removed from chaff by acid treatment, and the chaff is heated for carbonization. Silicon is reduced from the carbonized chaff, and nitrided to form silicon nitride.

6 Claims, 1 Drawing Figure

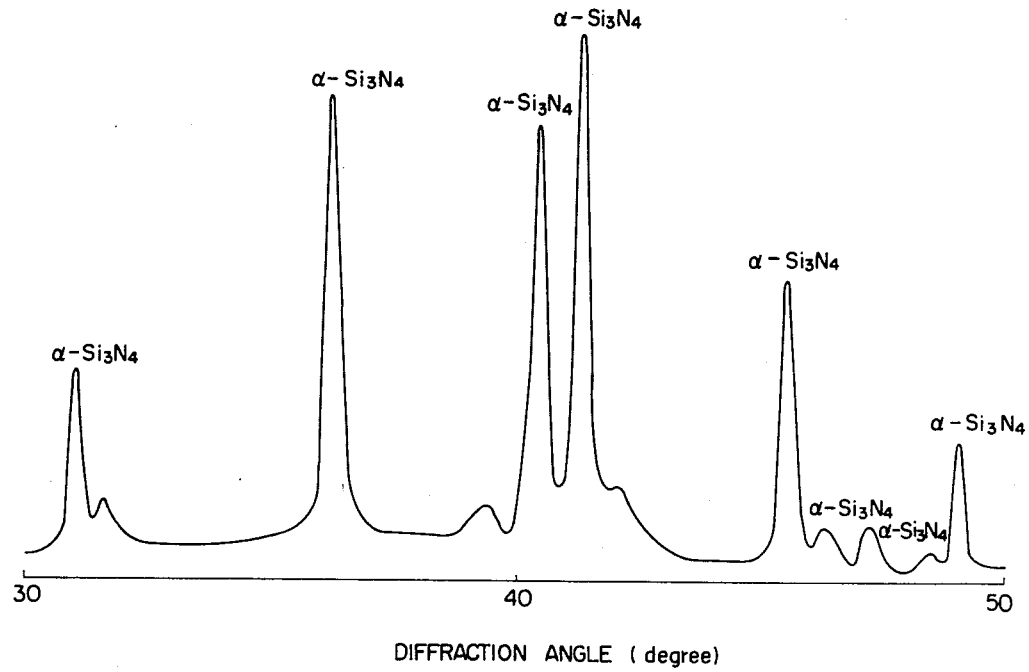

PROCESS FOR PRODUCING SILICON NITRIDE

BACKGROUND OF THE INVENTION

1. Field of the Invention:

This invention relates to a process for producing α-type silicon nitride from chaff.

2. Discription of the Prior Art:

A lot of people have recently come to study the use of silicon nitride as a refractory material for the construction of a gas turbine, or the like. It is one of the ceramic materials which are expected to be widely used in the future.

Various methods have hitherto been proposed and studied for the synthesis of silicon nitride. They include:
(1) Nitriding silicon powder;
(2) Vapor-phase reaction of silicon tetrachloride and ammonia, or silane and ammonia; and
(3) Heating a mixture of silicon dioxide and carbon in a nitrogen atmosphere to reduce and nitride silicon.

The last method is particularly of great industrial value, since silicon dioxide is abundantly available. More specifically, there is known a method employing chaff which contains a relatively large quantity of silicon dioxide. According to this method, a carbide is prepared from chaff, and heated in the presence of nitrogen, whereby silicon dioxide in the carbide is reduced and nitrided to form α-type silicon nitride. This method has a number of advantages including the elimination of the step of mixing silicon dioxide and carbon, and the easy adjustment of the particle size of silicon nitride.

Chaff, however, contains a lot of elements, such as calcium, sodium, potassium, magnesium, manganese and aluminum, in addition to silicon. The silicon nitride obtained from chaff, therefore, contains those elements as impurities, and they lower the strength at a high temperature of a product made by sintering from such silicon nitride. These impurities are usually present in the form of oxides, including calcium oxide which is particularly undesirable as it greatly lowers the strength of the sintered product.

SUMMARY OF THE INVENTION

It is an object of this invention to provide an improved process which makes it possible to produce silicon nitride of high purity from chaff.

The process of this invention essentially comprises treating chaff with an acid to remove impurities therefrom, carbonizing the chaff, reducing silicon from the carbonized chaff, and nitriding the silecon.

The acid treatment of the chaff for removing impurities therefrom can be performed very easily if it is immersed in a solution of the acid for a short time. The silicon nitride obtained by the process of this invention contains only a very small quantity of impurities, such as calcium, and therefore, provides a product having a high degree of strength at a high temperature when sintered.

BRIEF DESCRIPTION OF THE DRAWING

The drawing shows the X-ray diffraction pattern of silicon nitride obtained by a process embodying this invention.

DETAILED DESCRIPTION

The chaff employed by the process of this invention may be the threshed or winnowed husks of either aquatic or upland rice. The chaff usually contains about 20% by weight of silicon dioxide, and further contains metallic elements such as sodium, potassium, aluminum, magnesium and calcium. The chaff is usually covered by mud or other contaminants. Therefore, it is advisable to use it after washing it with water.

The first step of the process according to this invention resides in immersing chaff in an acid solution. The acid solution may be a solution of an inorganic acid such as hydrochloric, nitric, sulfuric or phosphoric acid, or an organic acid such as formic, acetic or tartaric acid. The use of a solution having an acid concentration of 0.01 to 10N is recommended to ensure the satisfactory removal of impurities and the ease of handling.

If chaff is dipped in such an acid solution, metallic elements, such as sodium, potassium, calcium, magnesium, manganese, aluminum and iron, other than silicon, form salts which are eluted in the solution. The acid solution also removes contaminants from the chaff. It is effective to use a stirrer in order to promote such elution and removal.

The chaff is preferably left in the acid solution for 1 to 20 hours, depending on the concentration of the acid in the solution. Less than an hour is insufficient for the satisfactory removal of impurities, while no appreciable increase in the removal of impurities can be expected from over 20 hours of immersion. The chaff is, then, removed from the solution, and the acid solution adhering to the chaff can be washed away with clean water before it is carbonized.

The chaff is, then, heated in a non-oxidizing atmosphere, whereby a tarry substance is removed from the chaff, and carbon is liberated as a reducing agent for silicon dioxide. This step of carbonization is preferably carried out at a temperature of 300° C. to 600° C. for three to five hours. The resulting volatilization of the organic substance from the chaff gives rise to a reduction of about 50% in its weight.

The steps of acid treatment and carbonization can be reversed without presenting any problem in the removal of impurities by acid treatment.

The carbonized chaff containing silicon dioxide is, then, subjected to nitriding. The silicon dioxide is reduced by the carbon which the chaff contains, and the resulting silicon is combined with nitrogen to yield silicon nitride. The step of nitriding is preferably carried out by heating at a temperature of 1,300° C. to 1,400° C. for 5 to 10 hours in a nitrogen atmosphere which preferably contains 99.99 to 100% by volume of nitrogen.

The silicon nitride produced by the process of this invention contains a by far smaller quantity of impurities than any silicon nitride obtained from chaff not subjected to the acid treatment which forms a part of this invention. This invention is particularly effective in reducing the quantities of sodium, potassium, calcium, magnesium, manganese and phosphorus. A product having a high degree of strength at a high temperature can be formed from the silicon nitride of this invention by pressureless sintering with the aid of a sintering assistant.

The process of this invention is applicable to not only the chaff of rice, but also the chaff of other plants of the rice family, such as barley, wheat, millet and barnyard grass.

The invention will now be described more specifically with reference to several examples thereof.

EXAMPLE 1

A total of 19 kinds of acid solutions were prepared each in the quantity of 0.3 liter as shown by Run Nos. 1 to 19 in TABLE 1. Into each acid solution were immersed 15 g of chaff of rice produced in Minamichita, which is a region in the central part of Japan. Each chaff was left to stand at ordinary room temperature for an hour. The solution was temporarily stirred to remove bubbles from the chaff. All the solutions turned yellow or yellowish brown upon immersion of the chaff. The chaff was, then, removed from the acid solution, and placed on a sieve. City water was sprinkled on the chaff to wash away the remaining solution therefrom.

Each acid-treated chaff was dried at a temperature of 100° C. for 15 hours. Then, it was put in a porcelain crucible having a cover, and heated at a temperature of 300° C. for five hours in an electric furnace for the purpose of carbonization. A graphite boat having inside dimensions of 70 mm by 15 mm by 10 mm was charged with 1.0 g of the carbonized chaff, and placed in a furnace with SiC heater. The graphite boat was heated at a temperature of 1,400° C. for five hours, while nitrogen gas was being supplied into the furnace at a rate of 2.0 liters per minute (in a standard condition), whereby a mixture of carbon and silicon nitride was obtained. The mixture was, then, heated at a temperature of 700° C. for 10 hours in the open air, whereby the residual carbon was removed to yield silicon nitride (Runs Nos. 1 to 19) having a greyish white color.

For comparison purposes, silicon nitride was prepared from chaff subjected to the steps of carbonization and nitriding without being treated with any acid. It is shown by Run No. C1 in TABLE 1.

The quantities of impurities in the silicon nitride obtained in each of Runs Nos. 1 to 19 and C1 were examined by plasma emission analysis. The results are shown in TABLE 1. As is obvious from TABLE 1, the silicon nitride obtained by the process of this invention including acid treatment (Runs. Nos. 1 to 19) was found to contain a by far smaller quantity of impurities than the silicon nitride produced from the chaff which had not been treated with any acid (Run No. C1).

TABLE 1

| Run No. | Acid solution Acid | Concentration (N) | Impurity metal element content ($\times 10^{-2}$ wt %) | | | | | | | | |
|---|---|---|---|---|---|---|---|---|---|---|---|
| | | | Na | K | Ca | Fe | Al | Mg | Mn | P | Total |
| 1 | Hydrochloric acid | 12 | 0.0 | 0.6 | 0.3 | 3.0 | 9.0 | 2.0 | 0.3 | 3.0 | 18.0 |
| 2 | " | 6 | " | 0.8 | 0.8 | 14.0 | 28.0 | 4.0 | 0.5 | 3.0 | 51.0 |
| 3 | " | 1.2 | " | 4.0 | 1.4 | 15.0 | 28.0 | 5.0 | 9.0 | 6.0 | 68.0 |
| 4 | Nitric acid | 14 | " | 0.6 | 0.3 | 2.0 | 5.0 | 2.0 | 0.2 | — | 10.0 |
| 5 | " | 7 | " | 0.9 | 0.6 | 9.0 | 15.0 | 3.0 | 0.3 | 0.4 | 29.0 |
| 6 | " | 1.4 | " | 3.0 | 1.6 | 10.0 | 20.0 | 5.0 | 10.0 | 3.0 | 53.0 |
| 7 | Sulfuric acid | 36 | " | 0.7 | 0.6 | 2.0 | 6.0 | 2.0 | 0.2 | — | 12.0 |
| 8 | " | 18 | " | 0.8 | 1.0 | 7.0 | 10.0 | 3.0 | 0.6 | — | 22.0 |
| 9 | " | 3.6 | " | 2.0 | 2.0 | 10.0 | 20.0 | 5.0 | 9.0 | — | 48.0 |
| 10 | Oxalic acid | 8 | " | 0.9 | 6.0 | 10.0 | 18.0 | 4.0 | 0.9 | — | 40.0 |
| 11 | " | 1.6 | 0.1 | 3.0 | 7.0 | 13.0 | 31.0 | 6.0 | 10.0 | 1.0 | 71.0 |
| 12 | Acetic acid | 16.7 | 0.0 | 0.8 | 2.0 | 4.0 | 14.0 | 2.0 | 0.7 | " | 25.0 |
| 13 | " | 8.3 | " | 3.0 | 5.0 | 12.0 | 20.0 | 4.0 | 1.0 | " | 46.0 |
| 14 | " | 1.7 | 0.2 | 4.6 | 5.0 | 10.0 | 14.0 | 4.0 | 1.0 | 0.8 | 39.0 |
| 15 | Formic acid | 20 | 0.0 | 0.8 | 0.6 | 13.0 | 20.0 | 1.0 | 0.4 | — | 36.0 |
| 16 | " | 10 | " | 1.0 | 2.0 | 14.0 | 26.0 | 3.0 | 0.4 | — | 48.0 |
| 17 | " | 2 | 0.1 | 3.0 | 3.0 | 14.0 | 27.0 | 5.0 | 1.0 | 1.0 | 60.0 |
| 18 | Tartaric acid | 3.3 | 0.0 | 1.0 | 3.0 | 12.0 | 19.0 | 5.0 | 0.8 | 2.0 | 43.0 |
| 19 | " | 0.7 | 0.4 | 7.5 | 3.0 | 14.0 | 29.0 | 5.0 | 0.9 | 0.5 | 64.0 |
| C1 | Washed with water | 2.7 | 13.0 | 17.0 | 15.0 | 34.0 | 22.0 | 11.0 | 17.0 | | 129.0 |

The silicon nitride obtained in Run No. 1 was identified by X-ray diffraction employing cobalt $K\alpha$ rays. The X-ray diffraction pattern thereby obtained is shown in the drawing. It was found to contain at least 95% of $\alpha$-type silicon nitride.

EXAMPLE 2

A porcelain crucible having a cover was charged with 150 g of chaff of the type used in EXAMPLE 1. The chaff was heated at a temperature of 300° C. for five hours for the purpose of carbonization in a furnace having a nichrome resistor. A solution of hydrochloric acid containing 36% by weight by HCl was diluted with city water to prepare seven kinds of acid solutions having different acid concentrations as shown by Runs Nos. 20 to 26 in TABLE 2. The carbonized chaff was devided into seven equal portions, and each portion was immersed in one of the acid solutions and left to stand for two hours. The chaff was, then, removed from each solution, washed with water, dried, and nitrided in the same way as in EXAMPLE 1, followed also by the removal of residual carbon, whereby seven kinds of silicon nitride were obtained.

The quantities of impurities in each silicon nitride were examined by plasma emission analysis. The results are shown in TABLE 2. As is obvious from TABLE 2, the reversal of the steps of acid treatment and carbonization was equally capable of producing silicon nitride containing only a very small quantity of impurity elements.

The silicon nitride thus obtained was identified in the same way as in EXAMPLE 1 as containing at least 95% of $\alpha$-type silicon nitride.

TABLE 2

| Run No. | Acid solution Acid | Concentration (N) | Impurity metal element content ($\times 10^{-2}$ wt %) | | | | | | | | |
|---|---|---|---|---|---|---|---|---|---|---|---|
| | | | Na | K | Ca | Fe | Al | Mg | Mn | P | Total |
| 20 | Hydrochloric acid | 12 | 0.0 | 0.7 | 0.4 | 4.0 | 10.0 | 1.0 | 0.2 | 3.0 | 19.0 |
| 21 | " | 9 | " | " | 0.6 | 9.0 | 26.0 | 3.0 | 0.3 | 2.0 | 42.0 |
| 22 | " | 6 | " | 1.0 | 0.7 | 15.0 | 31.0 | 4.0 | 0.5 | " | 58.0 |
| 23 | " | 4 | " | " | 1.0 | 13.0 | 32.0 | " | 0.6 | 4.0 | 57.0 |
| 24 | " | 1.2 | " | 3.0 | 1.4 | 16.0 | 30.0 | 5.0 | 0.9 | 5.0 | 61.0 |

TABLE 2-continued

| Run No. | Acid solution | | Impurity metal element content ($\times 10^{-2}$wt %) | | | | | | | | |
|---|---|---|---|---|---|---|---|---|---|---|---|
| | Acid | Concentration (N) | Na | K | Ca | Fe | Al | Mg | Mn | P | Total |
| 25 | " | 0.12 | 0.2 | 4.0 | " | 1.05 | 23.0 | 4.0 | 0.6 | 2.0 | 50.0 |
| 26 | " | 0.012 | 0.4 | 6.0 | 3.0 | 10.0 | 16.0 | 1.0 | 1.0 | 3.0 | 40.0 |

What is claimed is:

1. A process for producing silicon nitride, comprising:
   immersing chaff in a solution of an acid for a time sufficient to remove impurity elements therefrom;
   washing said chaff with water;
   drying said chaff;
   heating said chaff to carbonize it; and
   reducing silicon from said carbonized chaff and simultaneously nitriding said silicon.

2. A process according to claim 1, wherein said solution has an acid concentration of 0.01 to 10N.

3. A process according to claim 2, wherein said chaff is left in said solution for one to 20 hours.

4. A process according to claim 2, wherein said acid is an inorganic acid selected from the group consisting of hydrochloric acid, nitric acid, sulfuric acid and phosphoric acid.

5. A process according to claim 2, wherein said acid is an organic acid selected from the group consisting of formic acid, acetic acid and tartaric acid.

6. A process according to claim 1, wherein said heating is carried out before said immersing.

* * * * *